(12) United States Patent
Albright et al.

(10) Patent No.: US 12,427,596 B2
(45) Date of Patent: Sep. 30, 2025

(54) HYBRID PROJECTED AND STREAMING PULSE WELDING

(71) Applicant: Lincoln Global, Inc., Santa Fe Springs, CA (US)

(72) Inventors: Matthew A. Albright, Thompson, OH (US); Steven R. Peters, Huntsburg, OH (US); Thomas Rastatter, Chagrin Falls, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 1018 days.

(21) Appl. No.: 17/503,447

(22) Filed: Oct. 18, 2021

(65) Prior Publication Data
US 2022/0193807 A1 Jun. 23, 2022

Related U.S. Application Data

(60) Provisional application No. 63/129,810, filed on Dec. 23, 2020.

(51) Int. Cl.
*B23K 9/09* (2006.01)
*B23K 9/04* (2006.01)
(Continued)

(52) U.S. Cl.
CPC .............. *B23K 9/092* (2013.01); *B23K 9/04* (2013.01); *B23K 9/091* (2013.01); *B23K 9/1062* (2013.01);
(Continued)

(58) Field of Classification Search
CPC .......... B23K 9/092; B23K 9/04; B23K 9/091; B23K 9/1062; B23K 9/295
See application file for complete search history.

(56) References Cited

U.S. PATENT DOCUMENTS 3,475,586 A * 10/1969 Normando ............... B23K 9/09
219/130.51
5,508,493 A * 4/1996 Ueyama ................. B23K 9/091
219/130.51
(Continued)

FOREIGN PATENT DOCUMENTS

EP 3 693 116 A1 8/2020
JP H07-9149 A 1/1995

OTHER PUBLICATIONS

Extended European Search Report from Corresponding Application No. 21217002.1; Dated May 27, 2022; pp. 1-8.

*Primary Examiner* — Steven W Crabb
*Assistant Examiner* — Fahmida Ferdousi
(74) *Attorney, Agent, or Firm* — Brad C. Spencer (57) ABSTRACT

An arc welding or additive manufacturing system includes a wire feeder, a torch, a wire electrode driven through the torch by the wire feeder, and an arc generation power supply operatively connected to the torch to deliver a pulse waveform to the wire electrode during a deposition operation. The pulse waveform includes a series of current pulses and interleaved background current portions such that each current pulse is separated from a prior current pulse by a prior background current portion and separated from a subsequent current pulse by a subsequent background current portion. During each current pulse a molten droplet is projected from a tip of the wire electrode followed by an axial spray of molten metal away from the tip of the wire electrode before the subsequent background current portion occurs.

18 Claims, 9 Drawing Sheets

(51) Int. Cl.
 *B23K 9/10* (2006.01)
 *B23K 9/29* (2006.01)
 *B33Y 30/00* (2015.01)

(52) U.S. Cl.
 CPC .............. *B23K 9/295* (2013.01); *B33Y 30/00* (2014.12); *B23K 9/1006* (2013.01)

(56) References Cited

U.S. PATENT DOCUMENTS

| | | | |
|---|---|---|---|
| 5,877,468 | A | 3/1999 | Morlock |
| 8,809,737 | B2 | 8/2014 | Åberg et al. |
| 10,363,625 | B2 * | 7/2019 | Yamazaki ................ B23K 9/09 |
| 10,828,714 | B1 | 11/2020 | Cox et al. |
| 2005/0133488 | A1 | 6/2005 | Blankenship et al. |
| 2007/0056944 | A1 | 3/2007 | Artelsmair |
| 2013/0112676 | A1 | 5/2013 | Hutchison et al. |
| 2014/0263241 | A1 * | 9/2014 | Henry ................ B23K 9/1043 219/130.21 |
| 2019/0283165 | A1 * | 9/2019 | Baba ..................... B23K 9/173 |

* cited by examiner

HYBRID PROJECTED AND STREAMING PULSE WELDING

CROSS-REFERENCE TO RELATED APPLICATIONS

The present application claims priority to U.S. Provisional Patent Application Ser. No. 63/129,810 filed on Dec. 23, 2020, the disclosure of which is incorporated herein by reference.

BACKGROUND OF THE INVENTION

Field of the Invention

The present invention relates to arc welding operations that transfer molten metal from a wire electrode to a workpiece via spray transfer.

Description of Related Art

Heavy fabrication welding, such as welding plates and other workpieces greater than 0.25 inches thick, involves large weld puddles and slow torch travel speeds. Improved productivity is measured by higher deposition rates or improved ease of making larger weldment at conventional deposition rates. Often solid wire gas metal arc welding (GMAW) is used in heavy fabrication. When the weld puddle size is large, as is common in heavy fabrication, but the arc cone diameter is focused, the puddle will become unstable and will try to "swallow" the arc and tend to slosh.

Semi-automatic GMAW welding operations using solid wire and mixed shielding gas can be performed with acceptable results up to about 16 lb/hr (pounds per hour). Beyond 16 lb/hr, an unacceptable amount of spatter may be generated due to instability of the arc/puddle. Larger welding wires are preferred in order to increase the size of the arc cone to improve puddle control. Often operators will manipulate the arc (e.g., weaved in some manner) to control larger puddles. Metal cored wires and flux cored wires can be used to further increase deposit rate and puddle control but these alternatives result in higher fume rates and, in the case of flux cored arc welding (FCAW), slag that must be chipped later. It would be desirable to stably perform solid wire GMAW welding at deposition rates equaling or exceeding 16 lb/hr while minimizing arc/puddle instability and spatter.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is an arc welding or additive manufacturing system. The arc welding or additive manufacturing system comprises a wire feeder, a torch, a wire electrode driven through the torch by the wire feeder, and an arc generation power supply operatively connected to the torch to deliver a pulse waveform to the wire electrode during a deposition operation. The pulse waveform includes a series of current pulses and interleaved background current portions such that each current pulse is separated from a prior current pulse by a prior background current portion and separated from a subsequent current pulse by a subsequent background current portion. During each current pulse a molten droplet is projected from a tip of the wire electrode followed by an axial spray of molten metal away from the tip of the wire electrode before the subsequent background current portion occurs.

In accordance with another aspect of the present invention, provided is a an arc welding or additive manufacturing system. The arc welding or additive manufacturing system comprises a wire feeder, a torch, a wire electrode driven through the torch by the wire feeder, and an arc generation power supply operatively connected to the torch to deliver a pulse waveform to the wire electrode during a deposition operation. The pulse waveform comprises a series of current pulses and interleaved background current portions such that each current pulse is separated from a prior current pulse by a prior background current portion and separated from a subsequent current pulse by a subsequent background current portion. During each current pulse a molten droplet is projected from a tip of the wire electrode followed by one or both of a streaming spray and a rotating spray of molten metal away from the tip of the wire electrode before the subsequent background current portion occurs.

In accordance with another aspect of the present invention, provided is an arc welding or additive manufacturing system. The arc welding or additive manufacturing system comprises a wire feeder, a torch, a wire electrode driven through the torch by the wire feeder, and an arc generation power supply operatively connected to the torch to deliver a pulse waveform to the wire electrode during a deposition operation. The pulse waveform comprises a series of current pulses separated by respective background current portions. During each current pulse of the series of current pulses molten metal is transferred from the wire electrode to a workpiece by a projected spray transfer mode and a subsequent second spray transfer mode different from the projected spray transfer mode. During the projected spray transfer mode a molten droplet is projected from a tip of the wire electrode toward the workpiece, and during the subsequent second spray transfer mode an axial spray of molten metal from the tip of the wire electrode toward the workpiece occurs before a next background current portion.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

The present invention relates to arc welding operations that transfer molten metal from a wire electrode to a workpiece via spray transfer. In particular, the present invention involves a hybrid pulse welding process that transfers molten metal to the workpiece via at least two different transfer modes during each current pulse. For example, during the current pulse, a molten droplet can be conveyed to the workpiece via a projected spray transfer mode, and the projected spray transfer mode can be followed by the transfer of additional molten metal via a streaming or axial spray transfer mode and/or a rotating spray transfer mode.

The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

While embodiments of the present invention described herein are discussed in the context of a gas metal arc welding (GMAW) system, other embodiments of the invention are not limited thereto. For example, embodiments can be utilized in flux-cored arc welding (FCAW) or metal-cored arc welding (MCAW) welding operations, as well as other similar types of deposition operations. Further, embodiments of the present invention can be used in manual, semi-automatic and robotic welding operations. Embodiments of the present invention can also be used in metal deposition operations that are similar to welding, such as additive manufacturing, hardfacing, and cladding. As used herein, the term "welding" is intended to encompass all of these technologies as they all involve material deposition to either join or build up a workpiece. Therefore, in the interests of efficiency, the term "welding" is used below in the description of exemplary embodiments, but is intended to include all of these material deposition operations, whether or not joining of multiple workpieces occurs.

Figure 1:
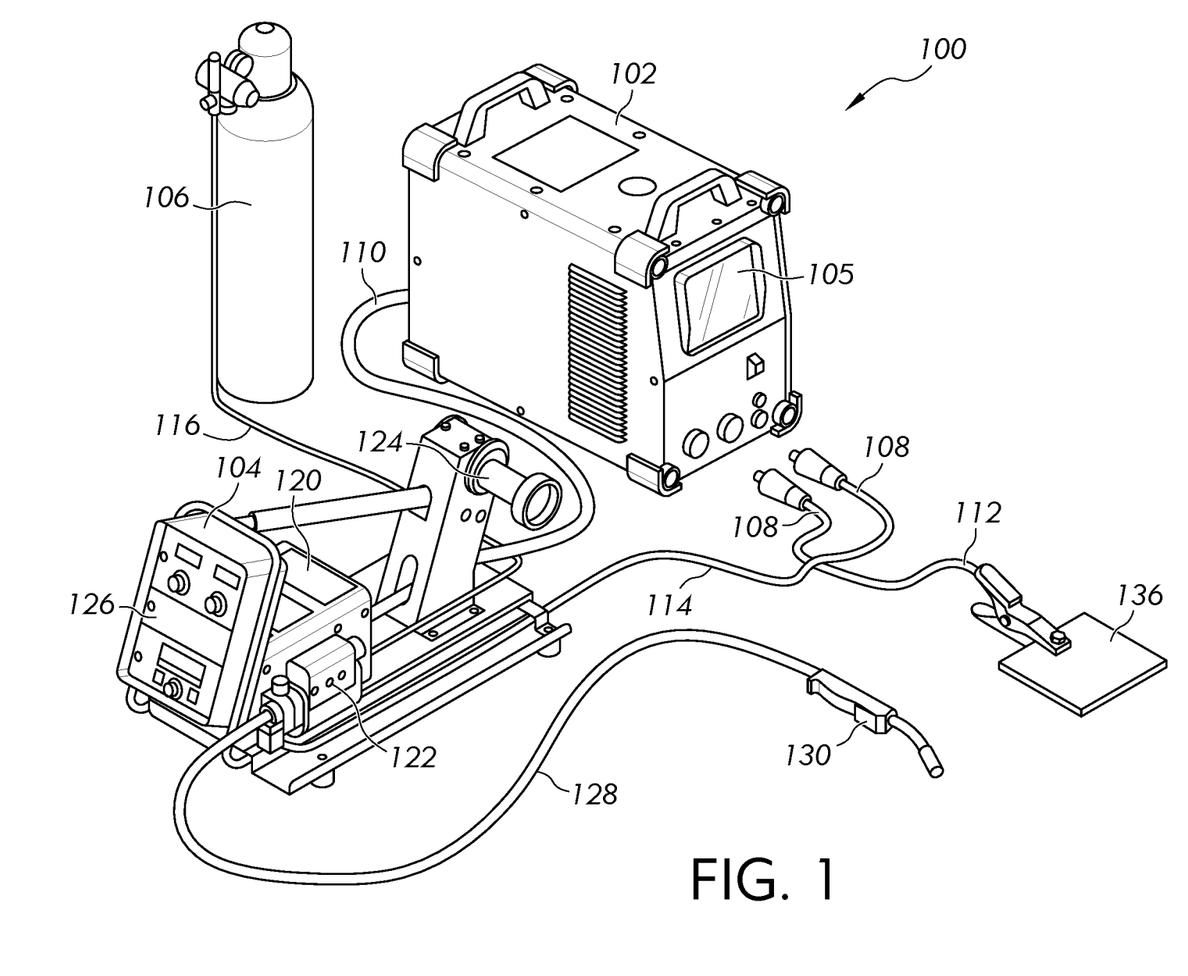
FIG. 1 is a perspective view of a welding system.

Referring now to the drawings, FIG. 1 shows an example GMAW welding system 100. The welding system 100 includes an arc generation power supply, such as welding power supply 102, wire feeder 104, and a shielding gas supply 106. Welding power supply 102 can include power cables 108, control cable 110, and input power cable (not shown). Power cables 108 can include a ground wire and clamp 112 connected to a workpiece 136, and power cable 114 configured to connect to wire feeder 104. Control cable 110 may be configured to connect to the wire feeder 104. In another embodiment (not shown), the control cable 110 may be replaced with a wireless communications link between the wire feeder 104 and power supply 102 and/or communications can occur over the power cable 114. It is understood that welding power supply 102, power cables 108, and control cable 110 can have any configuration suitable for supplying power and welding controls for the welding system 100. The power supply 102 further includes a user interface 105 through which a user can view and adjust various settings and parameters of the welding process (e.g., welding waveform parameters, voltage and/or current levels, wire feed speed, etc.) The user interface 105 can be located on the power supply 102 as shown, or be located remote from the power supply. In certain embodiments, the user interface 105 can be located on a remote processing device that communicates with the power supply 102, such as on a networked computer, a smart phone, a control pendant, or the like.

The wire feeder 104 drives a welding wire electrode toward the workpiece 136 during an arc welding or deposition operation. As shown in FIG. 1, the wire feeder 104 may include housing 120, gear box 122, wire spool assembly 124, and user interface 126. Extending from gear box 122 is a hose 128 that is configured to connect to a welding torch or gun 130. Housing 120 may be connected to the user interface 126 and gear box 122. Further, control cable 110 and power cable 114 extending from welding power supply 102, and pipe 116 extending from the shielding gas supply 106, are configured to connect to the wire feeder 104. Gear box 122 includes at least a plurality of rollers that advance and optionally retract the welding wire electrode during the deposition operation. It is understood that the wire feeder 104 may have any configuration suitable for receiving the shielding gas, welding power from the power supply 102, and welding controls. In certain embodiments, the wire feeder 104 may be directly attached to the welding power supply 102.

Extending between gear box 122 and welding torch 130 is hose 128 that can contain a power conductor, the wire electrode and a wire conduit or liner, a gas line, and a control cable for the torch's trigger switch. Hose 128 can be any diameter and length configured to contain the wire electrode, the gas line, and the switch cable. Hose 128 is made of any material suitable for welding environments. It is understood that hose 128 and welding torch 130 may have any configuration suitable for supplying the welding wire electrode, the shielding gas, and controls through the hose and to the welding torch.

Figure 2:
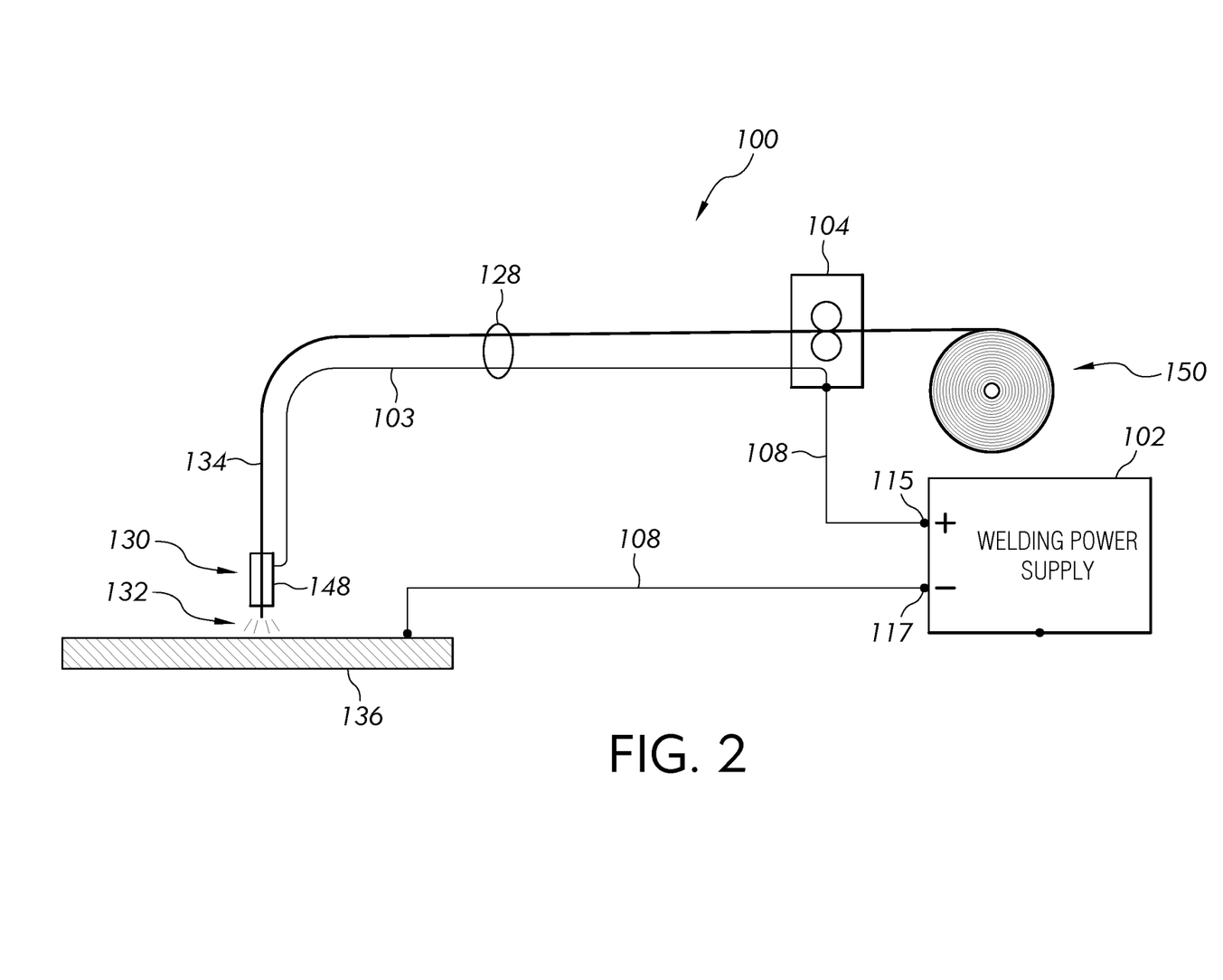
FIG. 2 is a schematic diagram of the welding system.

FIG. 2 provides a schematic diagram of the arc welding system 100. The power supply 102 provides a welding signal or welding waveform through power cables 108 to the welding torch 130 and workpiece 136. The welding signal has a current and a voltage, and can be a type of welding signal that requires a change in current from one level to another. For example, the signal can be a pulse welding signal which changes from a background to a peak level during welding, or an alternating polarity waveform that changes from one polarity to the other at a known rate. The current from the power supply 102 is delivered to a wire electrode 134 via a contact tip 148 to generate an arc 132 between the electrode 134 and the workpiece 136. As is common in GMAW welding operations, the positive power lead can be coupled to a wire feeder 104 which then passes the welding current through a welding cable in hose 128 to the contact tip 148. The power supply 102 can include terminals or output studs 115, 117 that connect the power cables 108 to the electrical output of the power supply.

Figure 3:
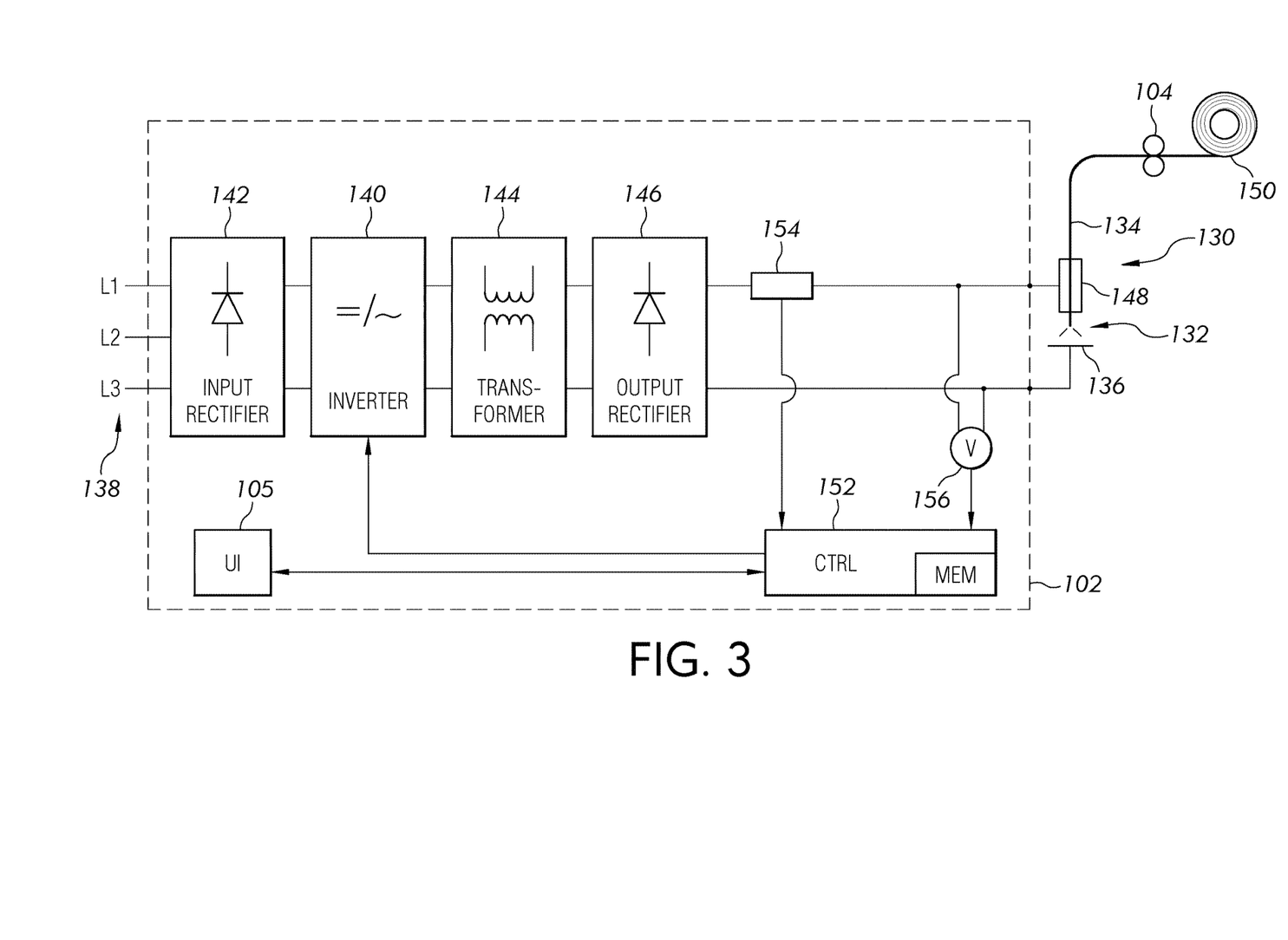
FIG. 3 is a schematic diagram of the welding system.

FIG. 3 shows a schematic diagram of an example GMAW welding power supply 102. The power supply 102 can be configured to generate welding waveforms for various modes of metal transfer, such as short-circuit transfer (GMAW-S), surface tension transfer (STT), axial spray transfer, and pulsed spray transfer. In particular, the welding power supply 102 can generate pulse welding waveforms for a hybrid pulse welding process that transfers molten metal to the workpiece 136 via at least two different transfer modes during each current pulse. For example, during the current pulse, a molten droplet can be conveyed to the workpiece via a projected spray transfer mode, and the projected spray transfer mode can be followed by the transfer of additional molten metal via a streaming or axial spray transfer mode and/or a rotating spray transfer mode.

The welding power supply 102 is operatively connected to the torch 130 to deliver a pulse waveform to the wire electrode 134 during a welding or other deposition operation. The welding power supply 102 generates an electric arc 132 between a wire electrode 134 and the workpiece 136 to perform the deposition operation. The welding power supply 102 receives electrical energy for generating the arc 132 from a power source 138, such as a commercial power source or a generator. The power source 138 can be a single phase or three phase power source. In certain embodiments, the arc welding system can be a hybrid system that includes one or more batteries (not shown) that also supply energy to the welding power supply 102. The welding power supply 102 includes a switching type power converter such as an inverter 140 for generating the arc 132 according to a desired welding waveform. Alternatively or additionally, the welding power supply 102 could include a DC chopper (not shown) or boost converter (not shown) for generating welding waveforms. AC power from the power source 138 is rectified by an input rectifier 142. The DC output from the rectifier 142 is supplied to the inverter 140. The inverter 140 supplies high-frequency AC power to a transformer 144, and the output of the transformer is converted back to DC by an output rectifier 146. The output rectifier 146 supplies welding current to welding torch 130 that is operatively connected to the power supply 102 (e.g., via a wire feeder). The torch 130 can have a contact tip 148 for transferring the electrical energy supplied by the power supply 102 to the wire electrode 134.

The electrode 134 is a solid or cored consumable wire welding electrode. The electrode 134 can be fed from a spool 150 by the wire feeder 104, which is configured to advance the electrode toward a weld puddle during the welding operation. As shown schematically in FIG. 3, the wire feeder 104 can include motor-operated pinch rollers for driving the wire electrode 134 through the torch 130.

The arc welding system can be configured for direct current electrode positive (DC+) or "reverse" polarity wherein the contact tip 148 and electrode 134 are connected to a positive lead from the power supply 102, and the workpiece 136 is connected to a negative lead. Alternatively, the arc welding system can be configured for direct current electrode negative (DC−) or "straight" polarity, wherein the workpiece 136 is connected to the positive lead and the contact tip 148 and electrode 134 are connected to the negative lead. Further, the arc welding system can be configured for AC welding in which AC waveforms are provided to the contact tip 148, electrode 134 and workpiece 136.

The power supply 102 includes a controller 152 operatively connected to the inverter 140 for controlling the welding waveforms generated by the power supply. The controller 152 can provide a waveform control signal to the inverter 140 to control its output. The controller 152 controls the output of the inverter 140 via the waveform control signal, to achieve a desired welding waveform, welding voltage, welding current, etc. The waveform control signal can comprise a plurality of separate control signals for controlling the operation of various switches (e.g., transistor switches) within the inverter 140. The power supply 102 further includes a user interface 105 through which a user can view and adjust various settings and parameters of the welding process (e.g., welding waveform parameters, voltage and/or current levels, wire feed speed, etc.) The controller 152 and the user interface 105 communicate bidirectionally to provide both user inputs and outputs at the user interface. The controller 152 monitors aspects of the welding process via feedback signals. For example, a current sensor, such as a current transformer (CT) or shunt 154, can provide a welding current feedback signal to the controller 152, and a voltage sensor 156 can provide a welding voltage feedback signal to the controller.

The controller 152 can be an electronic controller and may include a processor. The controller 152 can include one or more of a microprocessor, a microcontroller, a digital signal processor (DSP), an application specific integrated circuit (ASIC), a field-programmable gate array (FPGA), discrete logic circuitry, or the like. The controller 152 can include a memory portion (e.g., RAM or ROM) storing program instructions that cause the controller to provide the functionality ascribed to it herein. The controller 152 can include a plurality of physically separate circuits or electronic devices, such as a processor in combination with separate comparators, logic circuits, etc. However, for ease of explanation, the controller 152 is shown as a monolithic device.

Figure 4A:
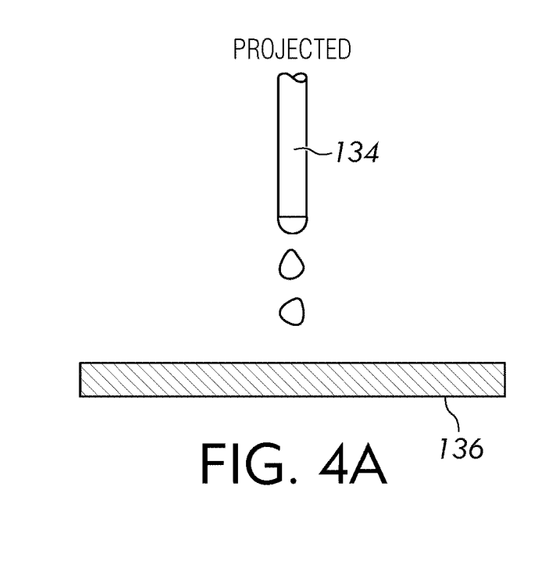
FIG. 4a shows a projected spray transfer mode during a welding operation.
Figure 4B:
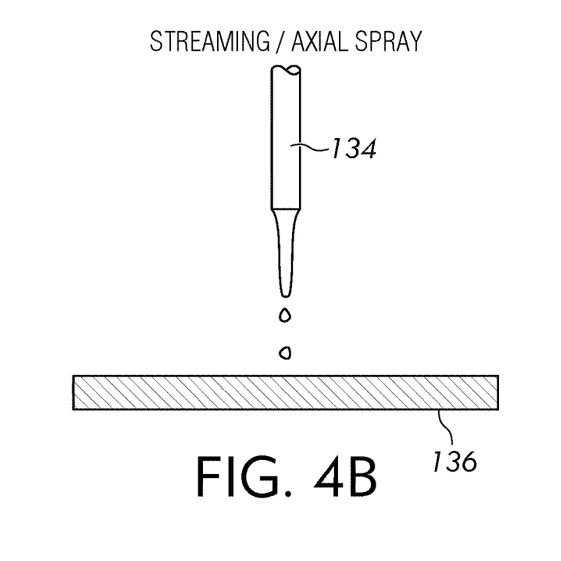
FIG. 4b shows a streaming or axial spray transfer mode during a welding operation.
Figure 4C:
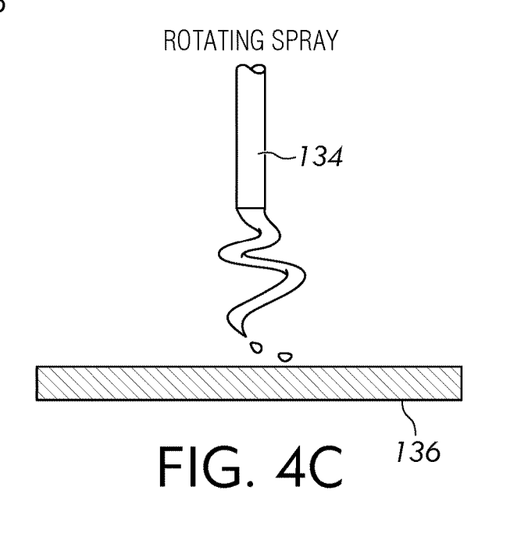
FIG. 4c shows a rotating spray transfer mode during a welding operation.
Figure 5A:
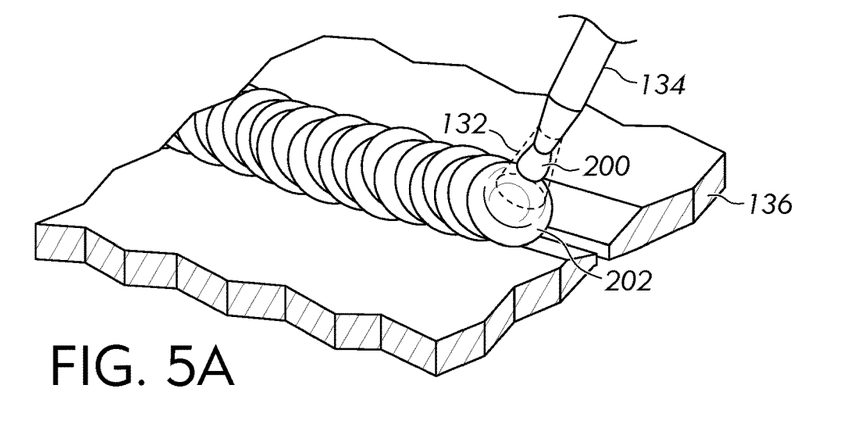
FIG. 5a shows a portion of a projected transfer welding operation.
Figure 5B:
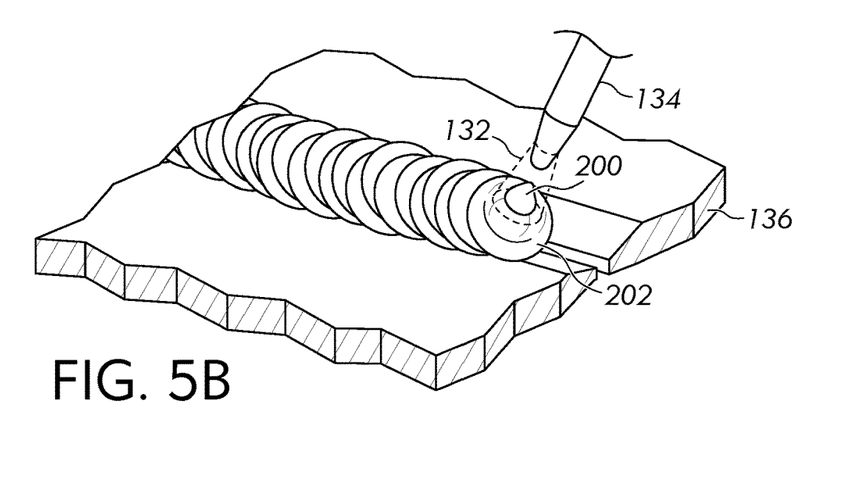
FIG. 5b shows a portion of a projected transfer welding operation.
Figure 5C:
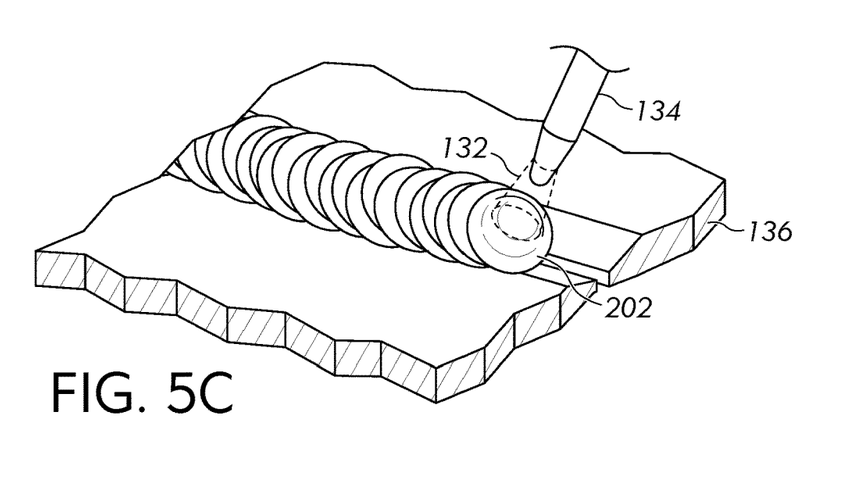
FIG. 5c shows a portion of a projected transfer welding operation.

FIGS. 4a-4c illustrate three different spray transfer modes for a deposition operation. FIG. 4a shows the a projected spray transfer mode, FIG. 4b shows the streaming or axial spray transfer mode, and FIG. 4c shows the rotating spray transfer mode. In the projected spray transfer mode (FIG. 4a), molten droplets are projected from the tip of the wire electrode 134 by respective current pulses that exceed a spray transfer transition current level. The streaming or axial spray transfer mode (FIG. 4b) is different from the projected spray transfer mode in that a more constant stream of molten metal, rather than distinct molten droplets, is projected from the tip of the wire electrode 134 toward the workpiece 136. The rotating spray transfer mode (FIG. 4c) is similar to the streaming or axial spray transfer mode with the addition of some rotation imparted to the stream of molten metal. FIGS. 5a-5c further shows a conventional pulse welding, projected spray transfer mode of a GMAW operation. The droplet 200 growing on the end of the electrode 134 can be seen FIG. 5a. A current pulse transfers the droplet 200 to the molten weld pool or puddle 202. Transfer of the droplet is shown in FIG. 5b. The molten material retracts toward the electrode 134 as the current is reduced from the pulse level to a background level, and a new droplet forms on the end of the electrode. In the projected spray transfer mode, one droplet is transferred per current pulse. It can be seen in FIGS. 5a-5c that the arc 132 covers a relatively small percentage of the weld pool's 202 surface (e.g., 50% or less). At high deposition rates (e.g., 16 lb/hr), conventional pulse welding can have a small, focused arc which undesirably agitates the weld pool 202 leading to instability.

Figures 6A, 6B, 6C, 6D, 6E:
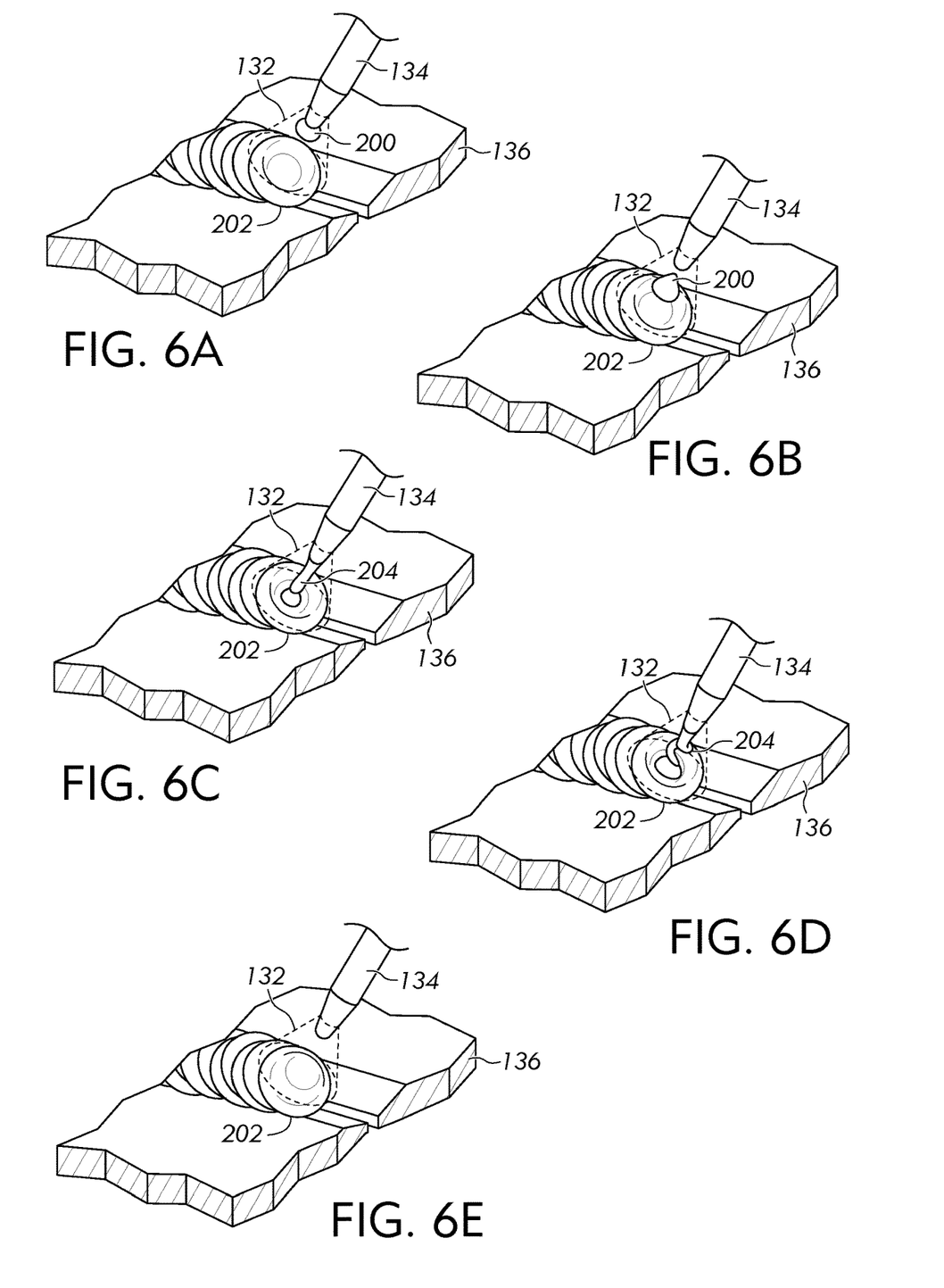
FIG. 6a shows a portion of a hybrid projected transfer, streaming and rotating spray welding operation.
FIG. 6b shows a portion of a hybrid projected transfer, streaming and rotating spray welding operation.
FIG. 6c shows a portion of a hybrid projected transfer, streaming and rotating spray welding operation.
FIG. 6d shows a portion of a hybrid projected transfer, streaming and rotating spray welding operation.
FIG. 6e shows a portion of a hybrid projected transfer, streaming and rotating spray welding operation.

The present invention employs a pulse welding waveform. During each current pulse, molten metal is transferred to the workpiece by the projected spray of a molten droplet which is then followed by an axial spray and/or a rotating spray of molten metal. These two or three different spray transfer modes occur sequentially during a single current pulse which results in a hybrid pulse welding process. FIGS. 6a-6e show the hybrid pulse welding process employing a projected spray transfer (FIGS. 6a, 6b) with a following streaming or axial spray transfer (FIG. 6c) further followed by a rotating spray of molten metal (FIG. 6d). The hybrid transfer combines at least two different metal transfer modes during one current pulse. The hybrid transfer is accomplished by using a pulse welding waveform in which the peak current level and a frequency and duration of the peak current portion of the waveform are sufficient to project a molten droplet from the end of the electrode toward the weld zone and cause the molten droplet to be followed by a streaming spray and/or rotating spray transfer of molten metal during the peak current portion. For a given high metal deposition rate (e.g., 16 lb/hr to 25 lb/hr) and wire feed speed (e.g., 400 to 1000 inches/minute), the frequency of the pulse waveform of the present invention is slower than a conventional pulsed gas metal arc welding (GMAW-P) waveform that only transfers one droplet per pulse. For example, in a deposition operation having a metal deposition rate that is approximately 16 lb/hr, a conventional pulse welding waveform may have a frequency in the range of 200 Hz-400 Hz, whereas the waveform used in the present hybrid pulse welding process is slower and can have a frequency in the range of 120 Hz-150 Hz.

As compared to a conventional heavy fabrication GMAW-P welding mode in which one droplet per pulse is transferred to the weld zone, the hybrid pulse welding process shown in FIGS. 6a-6e uses a slower pulse rate or frequency with longer pulses. As a result, the arc 132 becomes less focused and wider and it evens the pressure applied to the weld pool 202, which improves stability and allows better control of the weld pool. That is, the arc 132 of the hybrid pulse welding process covers a larger portion of the surface of the molten weld pool 202 as compared to a conventional pulse welding process. Both processes would apply similar forces to the weld pool 202 during welding, but the forces are spread out over a greater area of the weld pool in the hybrid pulse welding process. The lower pressure applied to the weld pool 202 combined with the slower pulse frequency results in the hybrid pulse welding process agitating the weld pool to a lesser degree than the conventional pulse welding process. This improves the stability of the welding process at high deposition rates. Additionally, the slower pulse frequency of the hybrid pulse welding process is easier on the operator's senses allowing the operator to slow down and accurately make larger welds.

After each current pulse of the hybrid pulse welding process and after the streaming spray transfer or rotating spray transfer that follows the projected spray of a molten droplet 200, the welding current is reduced to a background current level to stop the spray transfer and allow another molten droplet to grow on the end of the electrode 134. Metal is transferred by at least two different spray modes during each current pulse; a large projected droplet followed immediately by smaller axial spray or rotating spray droplets. Spray transfer is interrupted by low current cyclical background current portions, occurring immediately after each current pulse, that break up the rotation of the molten metal before it becomes out of control and unstable.

FIGS. 6a and 6b show the initial droplet being projected to the weld zone by a current pulse that exceeds the spray transfer transition current level. FIGS. 6c and 6d show the axial spray transfer and rotating spray transfer during the same current pulse. The molten stream 204 is just beginning to rotate in FIG. 6d. The background current portion of the welding waveform interrupts the axial/rotating spray transfer, as can be seen in FIG. 6e. The background current level is lower than the spray transfer transition current level and stops the transfer of molten metal while maintaining the arc 132. At higher deposition rates, some rotating spray transfer can occur, which can lead to instability and spatter. However, the rotating spray transfer can be controlled by limiting the duration of the peak current portion of the welding waveform after the droplet 200 is projected toward the weld zone.

The hybrid pulse welding process shown in FIGS. 6a-6e starts as a normal projected droplet transfer but continues to allow a stream of droplets to transfer via axial spray and/or rotating spray by slowing the pulse frequency down and allowing the arc to spread out over the surface of the weld pool to a greater extent than in conventional pulse welding. The hybrid pulse welding process combines the droplet transfer of the GMAW-P type transfer mode (large droplets) with axial and/or rotating spray transfer modes using a single current pulse.

When a ratio of the surface area of the weld pool 202 compared to the weld pool surface area that is covered by the arc 132 approaches 1 (i.e., the arc area covering the weld pool is nearly the size of the weld pool), the arc applies an even pressure to the weld pool. The hybrid pulse welding process shown in FIGS. 6a-6e can enlarge the arc area to nearly the size of the weld pool 202 to provide a more even pressure on the weld pool as compared to a conventional GMAW-P operation. For example, the electrical arc 132 from the wire electrode 134 can cover at least 80% (e.g., 80% to 100%) of the molten weld pool surface area during the hybrid pulse welding deposition operation. This can allow the operator to better control the weld pool. In conventional GMAW-P welding, the ratio of the surface area of the weld pool compared to the area covered by the arc increases above 1 (e.g., the arc is substantially smaller than the size of the weld pool), and as the deposition rate increases, the puddle tends to become turbulent and will slosh from side to side around the arc, resulting in instability and spatter. The larger arc cone 132 shown in FIGS. 6a-6e will tend to agitate the weld pool 202 to a lesser degree than the narrower arc cone used in conventional heavy fabrication GMAW-P welding.

Figure 7:
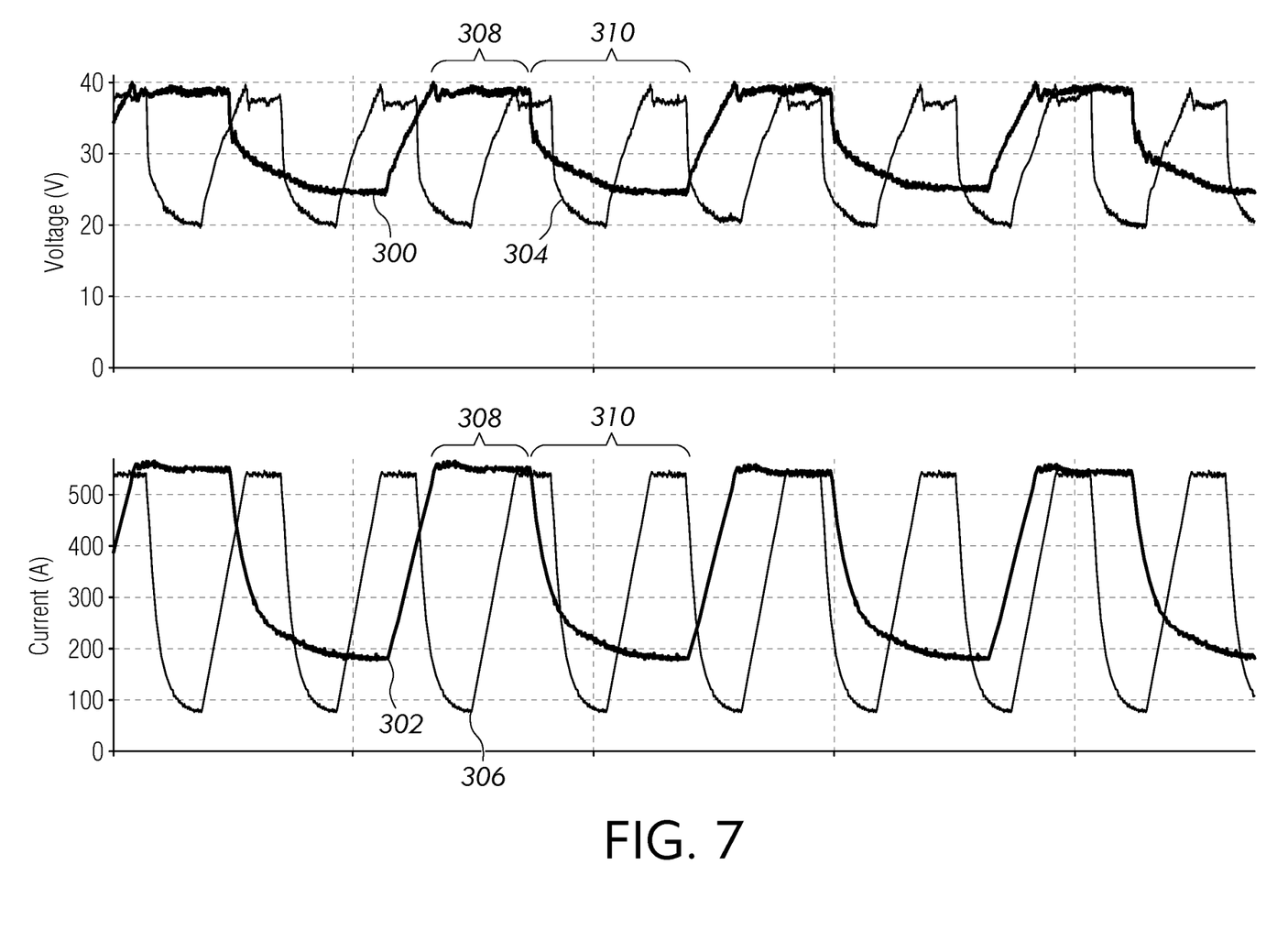
FIG. 7 shows example welding waveforms.

FIG. 7 shows example hybrid pulse welding voltage 300 and current 302 waveforms and conventional GMAW-P voltage 304 and current 306 waveforms. It can be seen that the welding waveforms 300, 302 for the hybrid pulse welding process have peak voltage and current portions 308 and background voltage and current portions 310. The background portions 310 can include a tail-out from the peak current level to the preset background current level. The durations of the peak portions 308 and background portions 310 are substantially longer in the hybrid pulse welding waveforms 300, 302 as compared to the conventional pulse welding waveforms 304, 306. As noted above, an example frequency range for the hybrid pulse welding waveforms is 120 Hz to 150 Hz, although other frequencies below 120 Hz and above 150 Hz are possible, and the deposition rate of the hybrid pulse welding process can exceed 16 pounds per hour.

It can be seen that the hybrid pulse welding waveforms 300, 302 comprise a series of current pulses 308 and interleaved background current portions 310 such that each current pulse is separated from a prior current pulse by a prior background current portion and separated from a subsequent current pulse by a subsequent background current portion. During each current pulse a molten droplet is projected from a tip of the wire electrode and is followed by a streaming or axial spray of molten metal away from the tip of the wire electrode before the subsequent background current portion occurs. The longer peak portions 308 of the hybrid pulse welding waveforms 300, 302, as compared to the conventional pulse waveforms 304, 306, generate the axial spray transfer immediately following the projected transfer of the molten droplet during the current pulse. During each current pulse, molten metal is transferred from the wire electrode to the workpiece by a projected spray transfer mode and then a subsequent second spray transfer mode that is different from the projected spray transfer mode (e.g., a streaming or axial spray transfer mode or a rotating spray transfer mode) before the next background current portion occurs. The rotating spray transfer mode can follow the streaming or axial spray transfer mode during the current pulse. Accordingly, during each current pulse the projected molten droplet can be followed by one or both of a streaming/axial spray and a rotating spray of molten metal away from the tip of the wire electrode before the subsequent background current portion occurs. In certain embodiments, the streaming/axial spray of molten metal is followed by a rotating spray of molten metal during the current pulse and before the subsequent background current portion occurs. In such embodiments, three different transfer modes take place during each current pulse (a projected spray transfer mode followed by the streaming/axial spray transfer mode followed by the rotating spray transfer mode). The subsequent or next background current portion that follows a current pulse stops the spray transfer mode (e.g., stops either the streaming/axial spray mode or the rotating spray mode) and allows the droplet to build and the wire electrode to be pushed into position for the next transfer cycle. The transition from the background current portion 310 to the current peak 308 can be slower in the hybrid pulse welding waveforms 300, 302 than in the conventional pulse welding waveforms 304, 306. Droplet growth occurs during both the background portion 310 and the transition to the current peak 308. During the transition to the current peak 308, the current is not high enough to promote spray transfer but the heating of the wire electrode is significantly higher than during the background portion 310. The end of the wire electrode will further melt during the transition to the current peak 308 and will add to the size of the molten droplet due to surface tension. Slowing the transition from the background current portion 310 to the current peak 308 promotes the growth of larger droplets, which is desirable. At the current levels used in the hybrid pulse welding process, the projected spray transfer mode tends to be more stable than the streaming/axial or rotational spray transfer modes, and, thus, the formation of larger droplets for the projected spray transfer mode can be desirable.

As discussed above, the hybrid pulse waveforms produce a larger arc area across the weld pool as compared to arcs generated in conventional GMAW-P operations. The larger arc coverage area is gentler on the molten weld pool at high deposition rates (e.g., 16 lb/hr or greater). Conventional GMAW-P pulse welding waveforms produce a smaller, more focused arc with a short arc length at such high deposition rates. When conventional GMAW-P welding is performed above about 16 lb/hr, the depression formed in the weld puddle becomes excessive and the weld pool starts to envelop the arc almost to a buried arc, and the puddle starts to become unstable as the liquid metal (the weld pool) sloshes from side to side. The hybrid pulse welding process discussed above can reduce the agitation and instability of the molten weld pool by enlarging the arc, which applies a more even pressure across the weld pool. Moreover, the slower pulse frequency used in the hybrid pulse welding process is easier on the operator's senses (e.g., vision and/or hearing) allowing the operator to slow down and accurately make larger welds.

Figure 8:
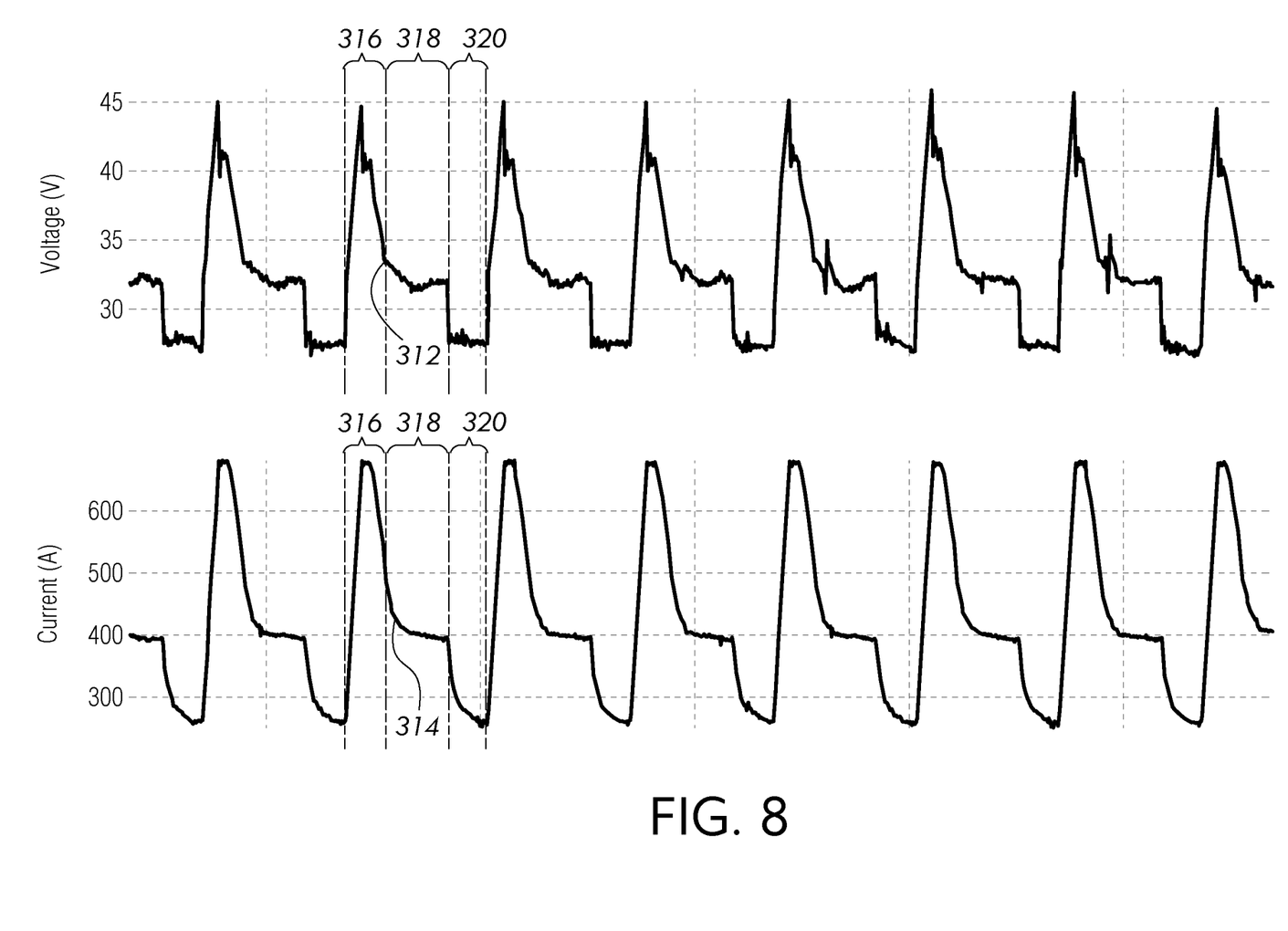
FIG. 8 shows a further example welding waveform.

FIG. 8 shows further example hybrid pulse welding voltage 312 and current 314 waveforms for performing a hybrid metal transfer. The high peak current portion 316 has a peak current level that is greater than 600 A. The high peak current portion 316 causes a molten droplet to be projected from the tip of the wire electrode toward the weld zone on the workpiece. A second, lower peak current portion 318 (e.g., about 400 A) follows the high peak current portion. The second peak current portion 318 provides a spray current level that is lower than the peak current level of portion 316. The second peak current portion 318 causes one or both a streaming spray and a rotating spray of molten metal toward the weld zone. A background current portion 320 having current level of less than 300 A for example follows the second peak current portion 318. The background current portion 320 can include a tail-out from the spray current level of the second peak current portion 318 to the preset background current level. The background current portion 320 stops the spray transfer occurring during the second peak current portion 318 and allows the droplet to build and the wire electrode to be pushed into position for the next transfer cycle.

Figure 9:
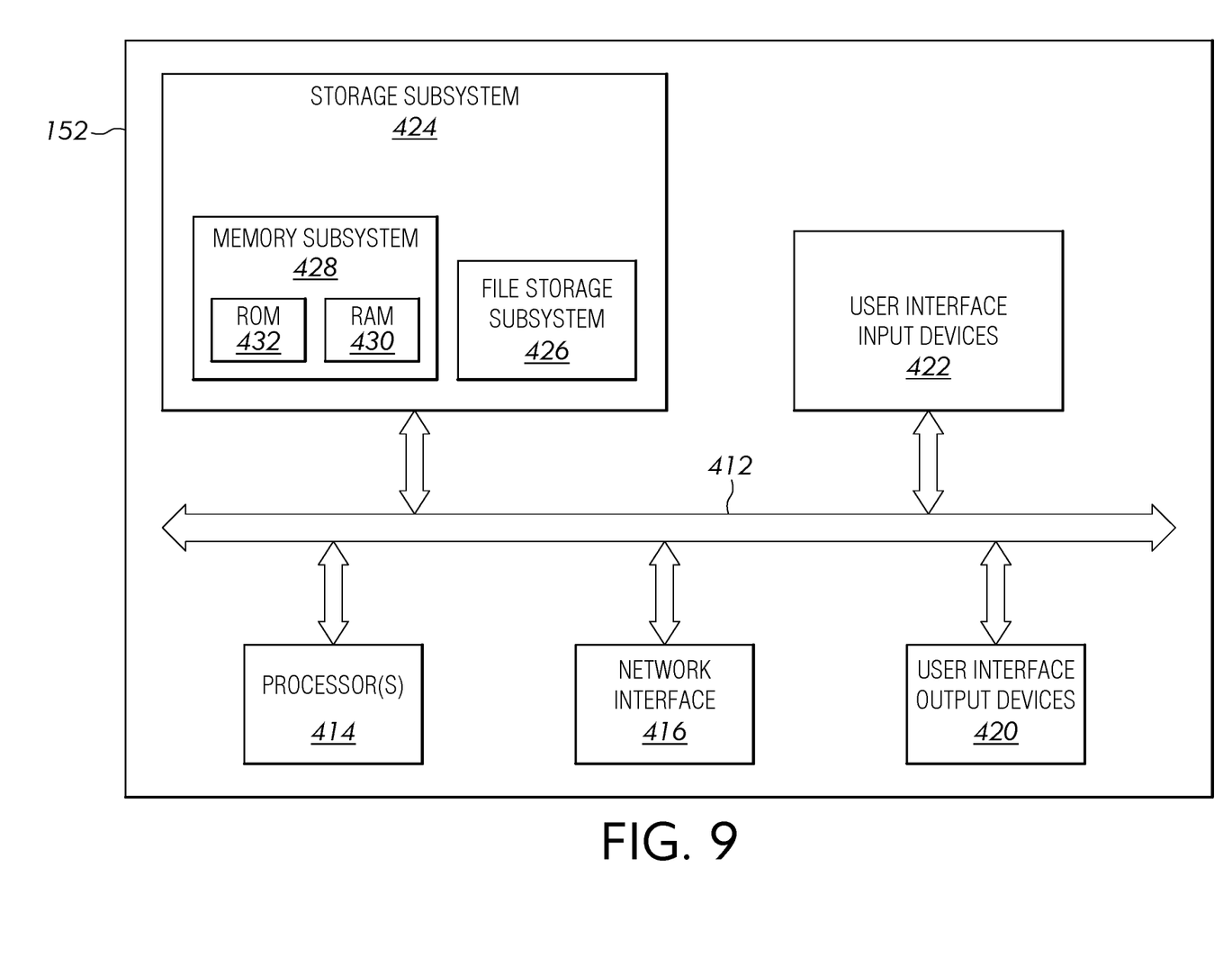
FIG. 9 shows an example controller.

FIG. 9 illustrates an embodiment of an example controller 152 controller operatively connected to the power supply to control the output current waveform. The controller 152 includes at least one processor 414 which can communicate with a number of peripheral devices via bus subsystem 412. These peripheral devices may include a storage subsystem 424, including, for example, a memory subsystem 428 and a file storage subsystem 426, user interface input devices 422, user interface output devices 420, and a network interface subsystem 416. The input and output devices allow user interaction with the controller 152. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 152 or onto a communication network.

User interface output devices 420 may include a display subsystem or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 152 to the user or to another machine or computer system.

Storage subsystem 424 provides a non-transitory, computer-readable storage medium that stores programming and data constructs that provide the functionality of some or all of the control algorithms and software modules described herein. These software modules are generally executed by processor 414 alone or in combination with other processors. Memory 828 used in the storage subsystem can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, flash memory, a floppy disk drive along with associated removable media, a CD-ROM drive, an optical drive, or removable media cartridges. The modules implementing the functionality of certain embodiments may be stored by file storage subsystem 426 in the storage subsystem 424, or in other machines accessible by the processor(s) 414.

Bus subsystem 412 provides a mechanism for letting the various components and subsystems of the controller 152 communicate with each other as intended. Although bus subsystem 412 is shown schematically as a single bus, alternative embodiments of the bus subsystem may use multiple buses.

Many other configurations of the controller 152 are possible having more or fewer components than the controller depicted in FIG. 9.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An arc welding or additive manufacturing system, comprising: a wire feeder; a torch; a wire electrode driven through the torch by the wire feeder; and an arc generation power supply operatively connected to the torch to deliver a pulse waveform to the wire electrode during a deposition operation, wherein the pulse waveform comprises a series of current pulses and interleaved background current portions such that each current pulse is separated from a prior current pulse by a prior background current portion and separated from a subsequent current pulse by a subsequent background current portion, and during each current pulse a molten droplet is projected from a tip of the wire electrode in a first metal transfer mode followed by an axial spray of molten metal away from the tip of the wire electrode in a second metal transfer mode different from the first metal transfer mode, before the subsequent background current portion occurs, wherein each current pulse comprises a peak current level that projects the molten droplet from the tip of the wire electrode, and a spray current level during which the axial spray of molten metal occurs, wherein the spray current level is less than the peak current level.

2. The arc welding or additive manufacturing system of claim 1, wherein the subsequent background current portion stops the axial spray of molten metal.

3. The arc welding or additive manufacturing system of claim 1, wherein the axial spray of molten metal is followed by a rotating spray transfer of molten metal before the subsequent background current portion occurs.

4. The arc welding or additive manufacturing system of claim 3, wherein the subsequent background current portion stops the rotating spray transfer of molten metal.

5. The arc welding or additive manufacturing system of claim 1, wherein a frequency of the pulse waveform is in the range of 120 Hz to 150 Hz, and a deposition rate of the deposition operation is greater than 16 pounds per hour.

6. The arc welding or additive manufacturing system of claim 5, wherein an electrical arc from the wire electrode covers at least 80% of a molten weld pool surface area during the deposition operation.

7. An arc welding or additive manufacturing system, comprising: a wire feeder; a torch; a wire electrode driven through the torch by the wire feeder; and an arc generation power supply operatively connected to the torch to deliver a pulse waveform to the wire electrode during a deposition operation, wherein the pulse waveform comprises a series of current pulses and interleaved background current portions such that each current pulse is separated from a prior current pulse by a prior background current portion and separated from a subsequent current pulse by a subsequent background current portion, and during each current pulse a molten droplet is projected from a tip of the wire electrode in a first metal transfer mode and followed by one or both of a streaming spray and a rotating spray of molten metal away from the tip of the wire electrode in a metal transfer mode different from the first metal transfer mode, before the subsequent background current portion occurs, wherein each current pulse comprises a peak current level that projects the molten droplet from the tip of the wire electrode, and a spray current level during which said one or both of the streaming spray and the rotating spray of molten metal occurs, wherein the spray current level is less than the peak current level.

8. The arc welding or additive manufacturing system of claim 7, wherein the subsequent background current portion stops one of the streaming spray and the rotating spray of molten metal.

9. The arc welding or additive manufacturing system of claim 7, wherein the streaming spray is followed by the rotating spray of molten metal before the subsequent background current portion occurs.

10. The arc welding or additive manufacturing system of claim 9, wherein the subsequent background current portion stops the rotating spray of molten metal.

11. The arc welding or additive manufacturing system of claim 7, wherein a frequency of the pulse waveform is in the range of 120 Hz to 150 Hz, and a deposition rate of the deposition operation is greater than 16 pounds per hour.

12. The arc welding or additive manufacturing system of claim 11, wherein an electrical arc from the wire electrode covers at least 80% of a molten weld pool surface area during the deposition operation.

13. An arc welding or additive manufacturing system, comprising: a wire feeder; a torch; a wire electrode driven through the torch by the wire feeder; and an arc generation power supply operatively connected to the torch to deliver a pulse waveform to the wire electrode during a deposition operation, wherein the pulse waveform comprises a series of current pulses separated by respective background current portions, and during each current pulse of the series of current pulses molten metal is transferred from the wire electrode to a workpiece by a projected spray transfer mode and a subsequent second spray transfer mode different from the projected spray transfer mode, wherein during the projected spray transfer mode a molten droplet is projected from a tip of the wire electrode toward the workpiece, and during the subsequent second spray transfer mode an axial spray of molten metal from the tip of the wire electrode toward the workpiece occurs before a next background current portion, wherein each current pulse comprises a peak current level that projects the molten droplet from the tip of the wire electrode, and a lower current level during which the axial spray of molten metal occurs, wherein the lower current level is less than the peak current level.

14. The arc welding or additive manufacturing system of claim 13, wherein the next background current portion stops the axial spray of molten metal.

15. The arc welding or additive manufacturing system of claim 13, wherein the axial spray of molten metal is followed by a third spray transfer mode different from the projected spray transfer mode and the second spray transfer mode, wherein during the third spray transfer mode a rotating spray of molten metal from the tip of the wire electrode toward the workpiece occurs before the next background current portion.

16. The arc welding or additive manufacturing system of claim 15, wherein the next background current portion stops the rotating spray of molten metal.

17. The arc welding or additive manufacturing system of claim 13, wherein a frequency of the pulse waveform is in the range of 120 Hz to 150 Hz, and a deposition rate of the deposition operation is greater than 16 pounds per hour.

18. The arc welding or additive manufacturing system of claim 17, wherein an electrical arc from the wire electrode covers at least 80% of a molten weld pool surface area during the deposition operation.

* * * * *